United States Patent
Sugiura et al.

(10) Patent No.: US 7,696,672 B2
(45) Date of Patent: Apr. 13, 2010

(54) ULTRASONIC SENSOR HAVING ACOUSTIC MATCHING MEMBER WITH CONDUCTIVE LAYER FORMED ON AND EXTENDING ONLY ALONG ACOUSTIC MATCHING MEMBER CONNECTING SURFACE

(75) Inventors: Makiko Sugiura, Hekinan (JP); Yasuyuki Okuda, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 11/987,448

(22) Filed: Nov. 30, 2007

(65) Prior Publication Data

US 2008/0224567 A1 Sep. 18, 2008

(30) Foreign Application Priority Data

Jan. 29, 2007 (JP) ............................. 2007-018027

(51) Int. Cl.
*H01L 41/08* (2006.01)
(52) U.S. Cl. ..................... 310/334; 310/328; 310/338; 310/348
(58) Field of Classification Search .................. 310/328, 310/338, 348, 334
See application file for complete search history.

(56) References Cited

U.S. PATENT DOCUMENTS

| | | | |
|---|---|---|---|
| 4,217,684 A | | 8/1980 | Brisken et al. |
| 5,376,860 A | | 12/1994 | Sato |
| 6,406,433 B1 | | 6/2002 | Mamayek |
| 6,466,513 B1 | * | 10/2002 | Pabon et al. .................. 367/35 |
| 6,551,247 B2 | * | 4/2003 | Saito et al. .................. 600/459 |
| 6,788,620 B2 | * | 9/2004 | Shiraishi et al. ............. 367/152 |
| 6,876,127 B2 | * | 4/2005 | Mitsuoka et al. ............ 310/324 |
| 6,989,625 B2 | * | 1/2006 | Suzuki et al. ............... 310/334 |
| 7,061,163 B2 | * | 6/2006 | Nagahara et al. ............ 310/334 |
| 7,246,523 B2 | * | 7/2007 | Magane et al. ................ 73/649 |
| 7,389,569 B2 | * | 6/2008 | Shiraishi et al. ............. 29/25.35 |

(Continued)

FOREIGN PATENT DOCUMENTS

JP    A-8-5615    1/1996

(Continued)

OTHER PUBLICATIONS

Office Action mailed Jan. 7, 2010 from the German Patent and Trademark Office in the corresponding patent application No. 10 2008 006 554.4-55 (English translation enclosed).

*Primary Examiner*—J. SanMartin
(74) *Attorney, Agent, or Firm*—Posz Law Group, PLC

(57) ABSTRACT

An ultrasonic sensor according to the present invention is used, for example, for detecting an obstacle positioned in front of an automotive vehicle. The ultrasonic sensor includes an piezoelectric element connected to an acoustic matching member and a processing circuit, all contained in a casing. Ultrasonic waves reflected on an object are received by the acoustic matching member and converted into electrical signals in the piezoelectric element. The electrical signals are processed in the processing circuit to thereby detect a distance to the object and/or positions of the object. A surface of the acoustic matching member connected to the piezoelectric element is made larger than the piezoelectric element to form an overhang area on a conductive layer formed on the acoustic matching member. In this manner, electrical connection in the ultrasonic sensor is easily made, and detection sensitivity of the ultrasonic sensor is enhanced.

15 Claims, 6 Drawing Sheets

U.S. PATENT DOCUMENTS

| | | | |
|---|---|---|---|
| 7,504,943 B2 * | 3/2009 | Takeuchi et al. | 340/545.1 |
| 2008/0307888 A1 * | 12/2008 | Yoshioka et al. | 73/627 |

FOREIGN PATENT DOCUMENTS

| | | | |
|---|---|---|---|
| JP | A-10-224895 | | 8/1998 |
| JP | A-2002-58099 | | 2/2002 |
| JP | A-2002-354591 | | 12/2002 |
| JP | A-2004-245603 | | 9/2004 |
| JP | 2005184687 A | * | 7/2005 |
| JP | 2007221707 A | * | 8/2007 |

* cited by examiner

ULTRASONIC SENSOR HAVING ACOUSTIC MATCHING MEMBER WITH CONDUCTIVE LAYER FORMED ON AND EXTENDING ONLY ALONG ACOUSTIC MATCHING MEMBER CONNECTING SURFACE

CROSS-REFERENCE TO RELATED APPLICATION

This application is based upon and claims benefit of priority of Japanese Patent Application No. 2007-18027 filed on Jan. 29, 2007, the content of which is incorporated herein by reference.

BACKGROUND OF THE INVENTION

1. Field of the Invention

The present invention relates to an ultrasonic sensor having a piezoelectric element connected to an acoustic matching member.

2. Description of Related Art

An ultrasonic sensor having a piezoelectric element mounted on a substrate such as a metallic or resin substrate has been known hitherto. The ultrasonic sensor receives ultrasonic waves transmitted from a transmitter and reflected on an object to be detected. Based on signals outputted from the ultrasonic sensor, a position and/or a distance of the object is detected in a two- or tree-dimensional manner.

Some of the ultrasonic sensors include an acoustic matching layer or a member for adjusting acoustic impedance and for improving a receiving efficiency of ultrasonic waves. An example of the ultrasonic sensor having the acoustic matching layer is disclosed in JP-A-2002-354591. In this example, an acoustic matching layer is connected to a center portion of a surface of the piezoelectric element.

In this type of the ultrasonic sensor, the piezoelectric element is sandwiched by a pair of electrodes, and one of the electrodes is connected to the acoustic matching layer. The electrode of the piezoelectric element connected to the acoustic matching layer is made larger than the acoustic matching layer to connect a lead wire to the electrode of the piezoelectric element.

However, if the electrode area connected to the acoustic matching layer is made larger than that of the acoustic matching layer, there is a portion of the piezoelectric element that is not connected to the acoustic layer. The non-connected portion of the piezoelectric element vibrates in a phase different from that of the connected portion, generating noises or causing attenuation of vibration. This results in decrease in detection efficiency. It is also conceivable to insert a wiring member between the electrode of the piezoelectric element and the acoustic matching layer. In this case, however, the piezoelectric element may be connected to the acoustic matching layer in a slanted manner, or a boundary may be formed between the piezoelectric element and the acoustic matching layer. The slanted connection and/or the boundary may cause attenuation of vibration and decrease in a connecting force between the piezoelectric element and the acoustic matching layer.

SUMMARY OF THE INVENTION

The present invention has been made in view of the above-mentioned problem, and an object of the present invention is to provide an improved ultrasonic sensor having an acoustic matching member, in which high detection efficiency is realized. Another object of the present invention is to provide a method of manufacturing such an ultrasonic sensor.

The ultrasonic sensor according to the present invention is advantageously used in an automotive vehicle to detect an obstacle in front of the vehicle, for example. The ultrasonic sensor may be mounted on a part of the vehicle such as a front bumper. The ultrasonic sensor includes an acoustic matching member for receiving ultrasonic waves reflected from an object to be detected, a piezoelectric element for converting ultrasonic vibrations in the acoustic matching member into electrical signals, and a processing circuit for processing the electrical signals to detect a distance to the object from the vehicle and/or positions of the object.

The piezoelectric element is sandwiched with a pair of electrodes and connected to the acoustic matching member via a conductive layer formed on the acoustic matching member. The piezoelectric element, the acoustic matching member and the processing circuit are contained in a casing. A vibration-attenuating member is disposed between side surfaces of the acoustic matching member and an inner wall of the casing to suppress vibration transmission between the casing and the acoustic matching member.

The piezoelectric member is made of a material such as lead-zirconate-titanate, and the acoustic matching member is made of a material such as polycarbonate. A surface area of the acoustic matching member connected to the piezoelectric element is made larger than an surface area of the piezoelectric member connected to the acoustic matching member, thereby forming an overhang area of the conductive layer on the contacting surface of the acoustic matching member. The overhang area is connected to the processing circuit through a wire that is bonded to the overhang area, thereby electrically connecting a first electrode of the piezoelectric element to the processing circuit. A second electrode of the piezoelectric element is electrically connected to the processing circuit through another wire.

Since the overhang area is formed on the conductive layer, the wire connecting the first electrode to the processing circuit is easily bonded on the conductive layer. The connecting surface of the acoustic matching member is larger than the area of the piezoelectric element connected to the acoustic matching member, and an entire area of the piezoelectric element is connected to the acoustic matching member. Therefore, no vibrations in different phases are generated in the acoustic matching member, and generation of noises is suppressed. Accordingly, ultrasonic vibrations received by the acoustic matching member are effectively transmitted to the piezoelectric element, thereby enhancing detection efficiency of the ultrasonic sensor.

The conductive layer formed on the connecting surface of the acoustic matching member may be extended to its side surface to bond a wire thereon for electrically connecting the conductive layer to the processing circuit. In this case the overhang area may be eliminated. A wiring element may be formed on an inner surface of the casing for easily making an electrically connection between the conductive layer and the processing circuit. Alternatively, the casing and the vibration-attenuating member may be made of a conductive material to simplify the electrical connection between the conductive layer and the processing circuit.

Plural combined units, each unit consisting of a piezoelectric element and an acoustic matching member, may be arranged in an array. A block for forming plural piezoelectric elements and another block for forming plural acoustic members are connected, and then the combined blocks are diced into individual combined units. In this manner, the plural combined units are easily manufactured.

According to the present invention, the electrical connection in the ultrasonic sensor is easily made and the detection sensitivity is enhanced. Other objects and features of the present invention will become more readily apparent from a better understanding of the preferred embodiments described below with reference to the following drawings.

DETAILED DESCRIPTION OF THE PREFERRED EMBODIMENTS

A first embodiment of the present invention will be described with reference to FIGS. 1A-3. The ultrasonic sensor according to the present invention is advantageously used in an automotive vehicle. The embodiment described here is an ultrasonic sensor for use in an automotive vehicle. Ultrasonic waves are transmitted from an on-board transmitter, and the ultrasonic waves reflected on an object to be detected (e.g., an obstacle in front of the vehicle) are received by the ultrasonic sensor, thereby detecting a distance from the vehicle and/or positions of the object.

Figure 1A:
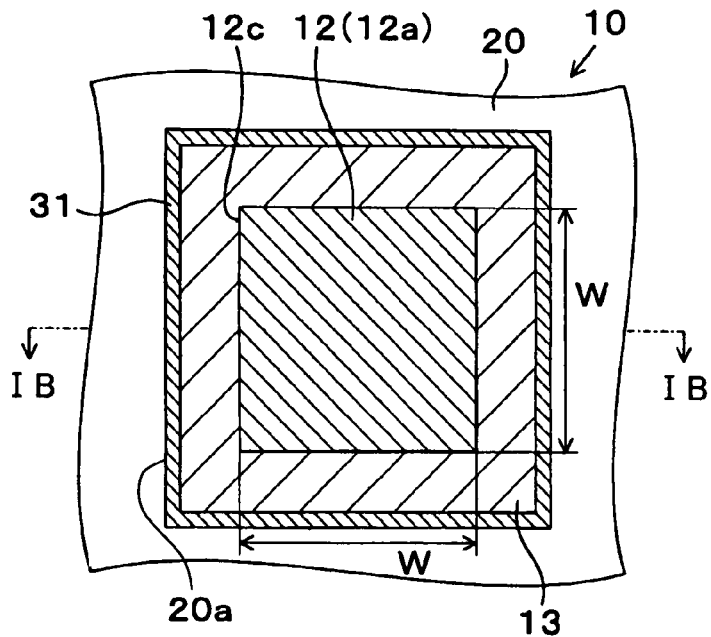
FIG. 1A is a plan view showing an ultrasonic sensor as a first embodiment of the present invention, viewed from an acoustic matching member connected to a piezoelectric element.
Figure 1B:
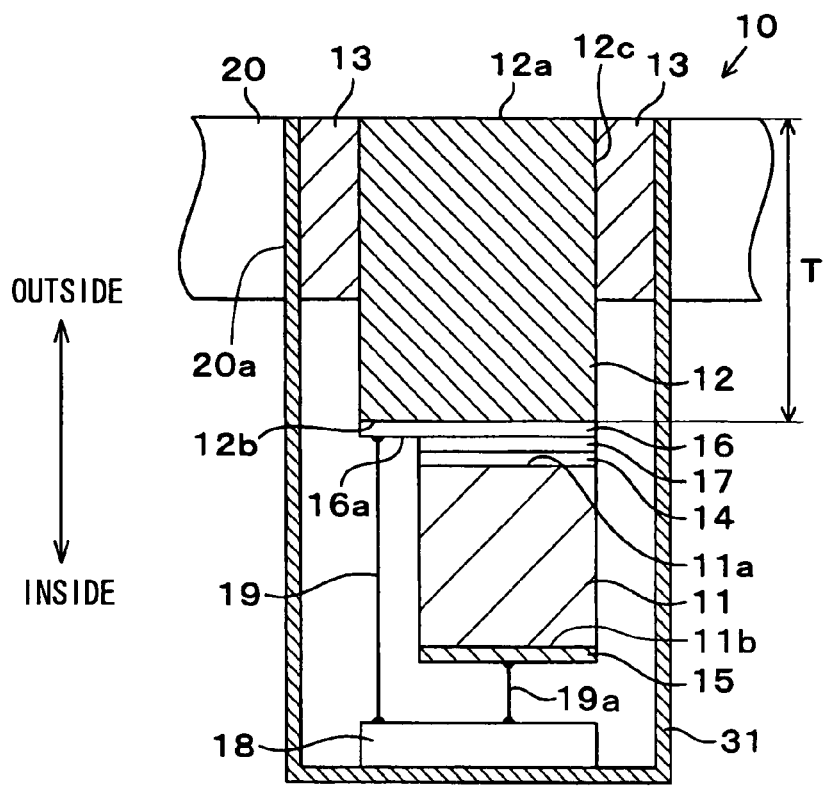
FIG. 1B is a cross-sectional view showing the ultrasonic sensor, taken along line IB-IB of FIG. 1.

First, referring to FIGS. 1A and 1B, a structure of the ultrasonic sensor 10 will be described. The ultrasonic sensor 10 includes a piezoelectric element 11 that converts ultrasonic vibrations to electrical signals, an acoustic matching member 12 that receives the ultrasonic waves and transfers ultrasonic vibrations to the piezoelectric element 11, and a processing circuit 18 that processes the output signals of the piezoelectric element 11. The acoustic matching member 12, the piezoelectric element 11 and the processing circuit 18 are contained in a casing 31 via a vibration-attenuating member 13.

Figure 7:
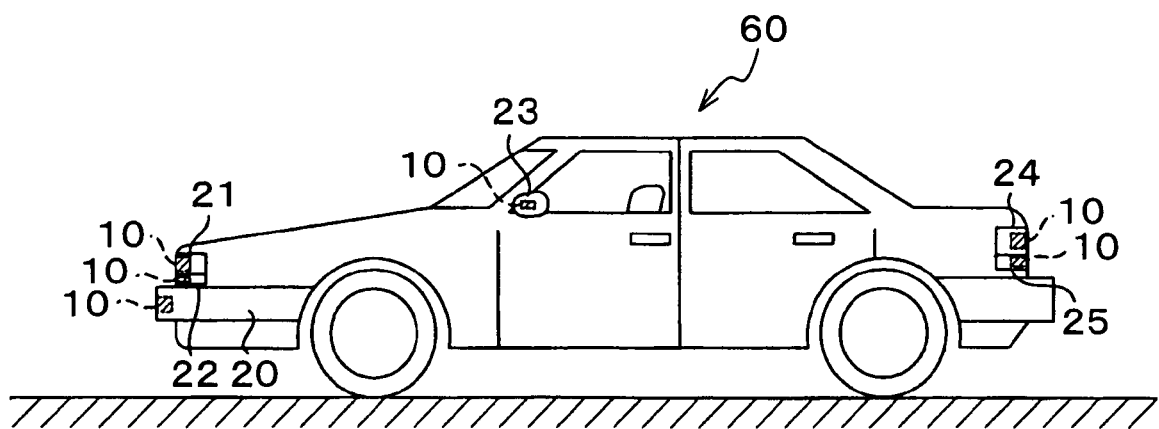
FIG. 7 is a schematic view showing positions of an automotive vehicle where the ultrasonic sensor may be mounted.

The casing 31 is inserted into a through-hole 20a formed in a front bumper 20 (refer to FIG. 7). The acoustic matching member 12 is shaped in a rectangular block and has a receiving surface 12a, a connecting surface 12b and side surfaces 12c. The receiving surface 12a is exposed outside of the front bumper 20. The vibration-attenuating member 13 is disposed between the side surfaces 12c and an inner wall of the casing 31 for suppressing transfer of the ultrasonic waves between the casing 31 and the acoustic matching member 12.

The piezoelectric element 11 is connected to the connecting surface 12b of the acoustic matching member 12 with conductive adhesive 17. The processing circuit 18 is positioned on a bottom wall of the casing 31 and electrically connected to the piezoelectric element 11 through wires 19, 19a.

The piezoelectric element 11 is made of, for example, lead-zirconate-titanate (PZT) and formed in a square pillar. The piezoelectric element 11 has a first surface 11a to be connected to the acoustic matching member 12 and a second surface 11b opposite the first surface 11a. A first electrode 14 is formed on the first surface 11a and a second electrode 15 is formed on the second surface 11b. Both electrodes 14, 15 are formed by sputtering or plating Pt, Cu or other metallic materials. Alternatively, they may be formed by baking a conductive paste. The first surface 11a of the piezoelectric element 11 is in a rectangular shape having a pair of long sides which are substantially equal to a width W (shown in FIG. 1A) of the acoustic matching member 12 and a pair of short sides which are shorter than the width W. Namely, an area of the first surface 1a is smaller than an area of the connecting surface 12b of the acoustic matching member 12. The piezoelectric element 11 is connected to the acoustic member 12 as shown in FIG. 1B, forming an overhang area 16a.

The acoustic matching member 12 is made of a material having an acoustic impedance larger than an acoustic impedance of air and smaller than that of the piezoelectric element 11. The acoustic matching member 12 is formed in a pillar shape having a square cross-section. A length of its side is W as shown in FIG. 1A. Since the acoustic impedance of the acoustic matching member 12 is in-between those of air and the piezoelectric element 11, an acoustic impedance difference at a boundary between the ultrasonic sensor 10 and air becomes smaller. Accordingly, the ultrasonic waves are less reflected on the boundary (i.e., on the receiving surface 12a), and a higher amount of the ultrasonic waves is received by the ultrasonic sensor 10.

Since the acoustic matching member 12 is positioned in front of the piezoelectric element 11 when the ultrasonic sensor 10 is mounted on the front bumper 20, the acoustic matching member 12 also serves as a protector for preventing water or dusts from reaching the piezoelectric element 11. The acoustic matching member 12 is made of a resin material having a high durability such as polycarbonate. Since temperature dependency of an elasticity coefficient of polycarbonate resin is small, changes in a wavelength of the ultrasonic wave according to temperature are small, and a standing wave can be stably generated.

A conductive layer 16 is formed on the connecting surface 12b of the acoustic matching member 12 by sputtering or plating Pt or Cu, or by baking a conductive paste. The conductive layer 16 covers an entire surface of the connecting surface 12b. The piezoelectric element 11 is connected to the acoustic member 12 with a conductive adhesive 17 (that is disposed between the first electrode 14 and the conductive layer 16).

A wire 19 is connected to the overhang area 16a by wire-bonding or soldering, and another wire 19a is connected to the second electrode 15. The piezoelectric element 11 is electrically connected to the processing circuit 18 through the wires 19, 19a. Since the overhang area 16a is exposed outside the piezoelectric element 11, the wire 19 is easily connected to the conductive layer 16.

Since the connecting surface 12b of the acoustic matching member 12 is larger than the first surface 11a of the piezoelectric element 11, an energy received by a unit area is increased in the piezoelectric element 11 compared with that in the acoustic matching member 12. Thus, energy transfer efficiency is increased. It is preferable to make the connecting surface 12b about 1.2 times of the first surface of the piezoelectric element 11. The width W of the acoustic matching member 12 is made equal to or smaller than a half of a wavelength λa of the ultrasonic wave in air, and its thickness T is made ¼ of a wavelength λm of the ultrasonic wave in the acoustic matching member 12. For example, when a frequency of the ultrasonic wave is 65 kHz, the width W is about 2.6 mm and the thickness T is about 5 mm.

By making the width W ¼ of the wavelength λm of the ultrasonic wave, a standing wave can be generated in the acoustic matching member 12. Mutual cancellation between the ultrasonic waves entered into the acoustic matching member 12 and the ultrasonic waves reflected on a boundary between the acoustic matching member 12 and the piezoelectric element 11 is suppressed. Therefore, the ultrasonic waves are effectively transferred to the piezoelectric element 11.

The vibration-attenuating member 13 is made of a material having an acoustic impedance lower than that of the acoustic matching member 12 and having a high attenuation coefficient, such as silicone rubber. Further, as a material of the vibration-attenuating member 13, a material having a low elasticity coefficient and a low density, such as a rubber-type material, foam-resin or a sponge, may be used. The vibration-attenuating member 13 is disposed between the inner wall of the casing 31 and the side surfaces 12c of the acoustic matching member 12 and fixed there with adhesive. Transfer of the ultrasonic waves from the bumper 20 to the acoustic matching member 12, which may generate noises, is suppressed by the vibration-attenuating member 13. Since the material having a low elasticity coefficient does not firmly restrain vibrations of the acoustic matching member 12, attenuation of the ultrasonic waves is lowered. Thus, sensitivity in detecting the ultrasonic waves is enhanced.

In the ultrasonic sensor 10 having a structure as described above, the ultrasonic waves are received by the receiving surface 12a of the acoustic matching member 12 and transferred to the piezoelectric element 11 via the acoustic matching member 12. The ultrasonic vibrations received by the piezoelectric element 11 are converted into electrical signals. The electrical signals are fed to an on-board electronic control unit (not shown) via the processing circuit 18. The electronic control unit calculates a time lag or a phase difference between transmitted and received ultrasonic waves based on the signals fed from the processing circuit 18. Positions and/or a distance from the vehicle to the object is calculated based on the time lag or the phase difference.

Advantages attained in the first embodiment will be summarized below. Since the connecting surface 12b of the acoustic matching member 12 is made larger than the first surface 11a of the piezoelectric element 11, the piezoelectric element 11 is fully connected to the acoustic matching member without leaving an area not connected. Therefore, vibrations having different phases do not exist in the acoustic matching member 12, no noise is generated therein, and attenuation of vibrations is suppressed. The ultrasonic waves received by the acoustic matching member 12 are effectively transferred to the piezoelectric element 11, and thereby sensitivity in detecting the ultrasonic waves is enhanced. In addition, since the area of the first surface 11a is smaller than the connecting surface 12b of the acoustic matching member 12, the ultrasonic wave energy per a unit area is increased in the piezoelectric element 11.

Since the overhang area 16a are formed on the conductive layer 16 on connecting surface 12b, the wire 19 is easily connected to the conductive layer 16. The piezoelectric element 11 can be more firmly connected to the acoustic matching member 12, compared with a case where a lead wire is inserted between the acoustic matching member 12 and the piezoelectric element 11.

Since the acoustic matching member 12 is made of a polycarbonate-type resin having an elasticity coefficient that does not vary much according to temperature, changes in the wavelength of the ultrasonic waves according to temperature can be suppressed. Since the piezoelectric element 11 is made of lead-zirconate-titanate having a high piezoelectric coefficient, the ultrasonic waves at a low level can be received, and sensitivity of the ultrasonic sensor is improved.

Figure 2A:
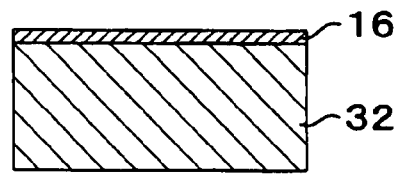
FIGS. 2A-2C are cross-sectional view for explaining a manufacturing process of the ultrasonic sensor.
Figure 2B:
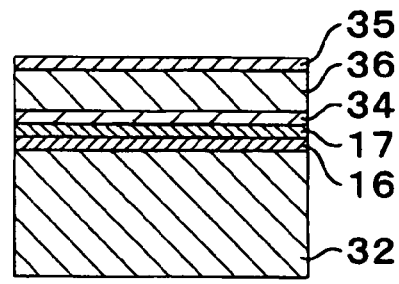
Figure 2C:
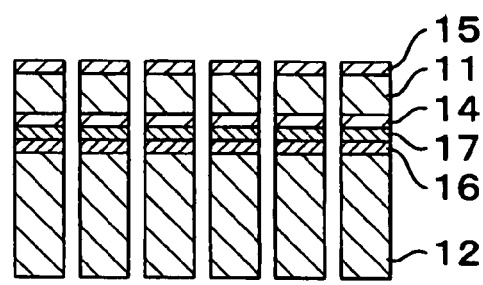
Figure 2D:
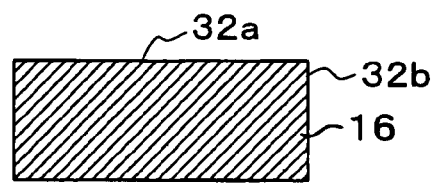
FIGS. 2D-2F are plan view showing the ultrasonic sensor, viewed from a piezoelectric element side, corresponding to FIGS. 2A-2C, respectively.
Figure 2E:
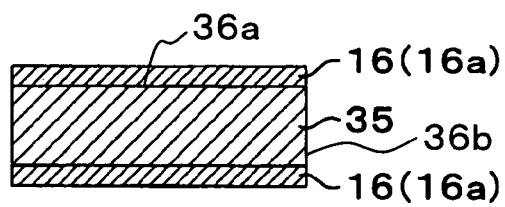
Figure 2F:
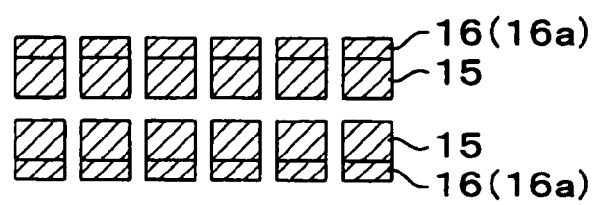

A method of manufacturing the ultrasonic sensor will be explained with reference to FIGS. 2A-2C showing side views and FIGS. 2D-2F showing plan views viewed from a piezoelectric element side. FIGS. 2D-2F show plan views respectively corresponding to side views shown in FIGS. 2A-2C. In this manufacturing method, plural combined units, each composed of a piezoelectric element 11 and an acoustic matching member 12, can be manufactured at the same time.

As shown in FIGS. 2A and 2D, a block 32 (made of a material such as polycarbonate) for forming plural acoustic members 12 is prepared. On one surface of the block 32, a conductive layer 16 is formed by sputtering or plating Pt or Cu, or baking a conductive paste. The block 32 (and the conductive layer 16) has long sides 32a and short side 32b, as shown in FIG. 2D.

As shown in FIGS. 2B and 2E, a block 36 (made of a material such as PZT) for forming plural piezoelectric elements 11 is prepared. On a first surface of the block 36, an electrode 34 for making the first electrode 14 is formed in the same manner as the conductive layer 16. On a second surface of the block 36, another electrode 35 for making the second electrode 15 is similarly formed. The block 36 (and the electrode 35) has long sides 36a which are the same as the long sides 32a of the block 32 and short sides 36b which are shorter than the short sides 32b of the block 32, as shown in FIG. 2E. The block 32 having the conductive layer 16 and the block 36 having electrodes 34, are laminated on each other and connected to each other with conductive adhesive 17, as shown in FIGS. 2B and 2E. In this manner, the overhang areas 16a are formed at both sides of the block 32 (the electrode 35), as shown in FIG. 2E. A width of the overhang area 16a is made about 0.5 mm, so that the wire 19 can be connected thereto by bonding or soldering.

As shown in FIGS. 2C and 2F, the laminated block (32 plus 36) is diced in the laminated direction along the long side 36a and short side 36b, thereby forming plural combined units, each including the piezoelectric element 11 and the acoustic matching member 12. Each combined unit includes the overhang area 16a. In this particular example, dicing is performed one time along the long side 36a, and five times along the short side 36b, thereby making 12 pieces of combined units.

As described above, plural combined units are easily manufactured by performing the process of connecting the block 32 to the block 36 only one time. Further, since two blocks having a relatively large area are connected with the conductive adhesive, the two blocks 32, 36 are connected at a right position without slanting to each other. If small pieces are connected, after cutting out, it is difficult to keep both pieces at an upright position. If two pieces are connected in a slanted position, detection sensitivity as an ultrasonic sensor will be adversely affected.

The combined unit composed of the piezoelectric element 11 and the acoustic matching member 12, manufactured as above, is electrically connected to the processing circuit 18, and contained in the casing 31. The acoustic matching member 12 is fixed to an opening of the casing 31 via the vibration-attenuating member 13. Thus, the ultrasonic sensor 10 is completed.

The first embodiment described above may be variously modified. For example, although the acoustic matching member 12 is made of a resin material in the first embodiment, it may be made of other materials such as ceramics or glass, as far as an acoustic impedance matching with the piezoelectric element 11 is satisfied, and a relation between the wavelength and the dimensions is satisfied. Since ceramics or glass has an excellent weather-resistance, it can be advantageously used when such quality is required for the ultrasonic sensor. It is not necessary to fully cover the connecting surface 12b with the conductive layer 16. The conductive layer 16 has to be formed at least to establish electrical connection to the first electrode 14 and cover the overhang area 16a for connecting the wire 19.

Figure 3:
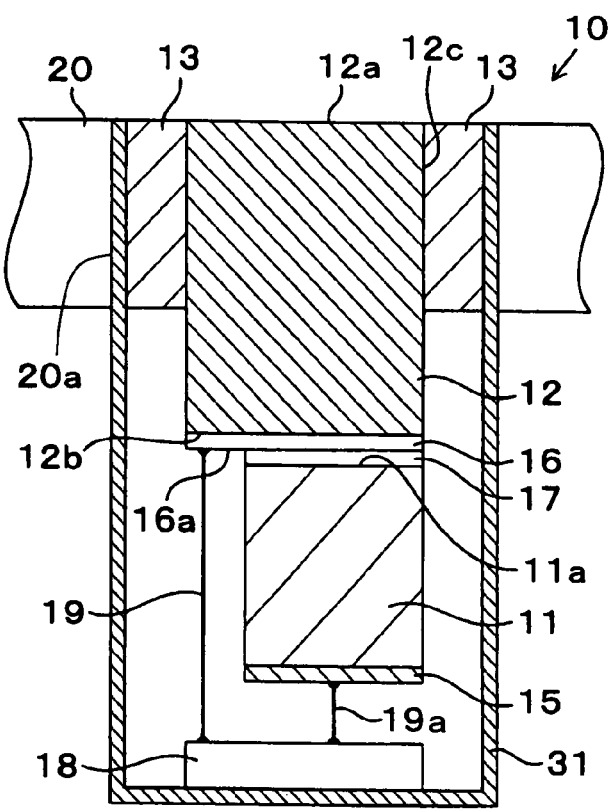
FIG. 3 is a cross-sectional view showing a modified form of the first embodiment shown in FIGS. 1A and 1B.

As shown in FIG. 3, the first electrode 14 formed on the first surface 11a of the piezoelectric element 11 may be eliminated. In this case, the first surface 11a is connected to the conductive layer 16 formed on the acoustic member 12 with the conductive adhesive 17. A process of forming the electrodes on the piezoelectric element 11 is somewhat simplified because only the second electrode 15 has to be formed on the piezoelectric element 11.

The piezoelectric element 11 may be connected to a center portion of the connecting surface 12b. The piezoelectric element 11 may be made of materials other than PZT, such as quartz crystal, zinc-oxide, lithium-niobate, tantalic-acid-lithium or polyvinylidene-fluoride.

Figure 4:
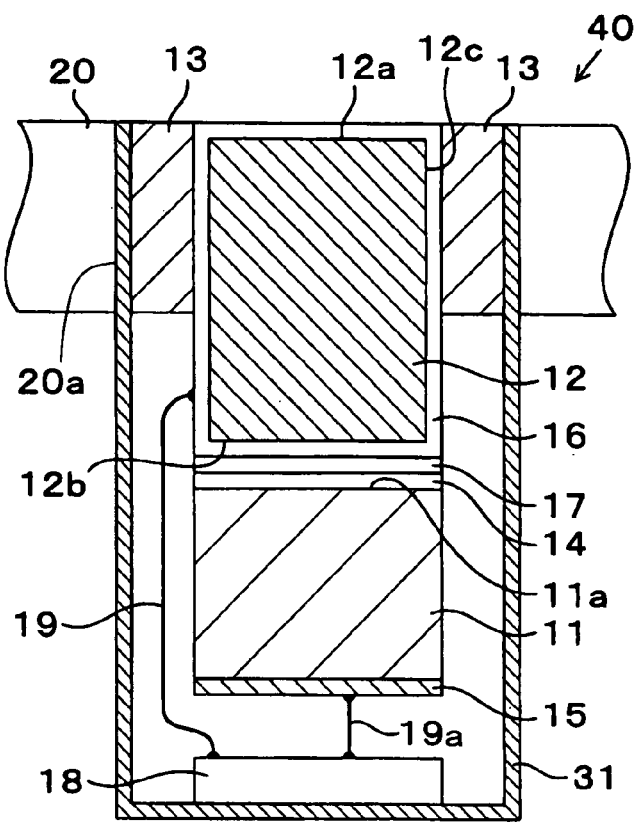
FIG. 4 is a cross-sectional view showing an ultrasonic sensor as a second embodiment of the present invention.

An ultrasonic sensor 40 as a second embodiment of the present invention will be described with reference to FIG. 4. In this embodiment, the conductive layer 16 formed on the connecting surface 12b is extended to cover an entire surface of the acoustic matching member 12. It is also possible to extend the conductive layer 16 to partially cover its side surface 12c. The conductive layer 16 is formed as a thin film not to hinder vibration of the acoustic matching member 12. The connecting surface 12b is made to have the substantially the same area as the first surface 11a of the piezoelectric element 11. It is possible, however, to make the connecting surface 12b larger than the first surface 11a of the piezoelectric element 11.

The first electrode 14 is connected to the conductive layer 16 with the conductive adhesive 17 in the same manner as in the first embodiment. In the second embodiment, the wire 19 is bonded to the conductive layer 16 formed on the side surface 12c of the acoustic matching member 12 and electrically connected to the processing circuit 18. Since the conductive layer 16 is formed also on the side surface of the acoustic matching member 12, the wire 19 can be connected to the conductive layer 16 even though there is no overhang area 16a. The conductive layer 16 also serves as a film preventing water or oil from contacting the acoustic matching member 12, thereby improving weather-resistance of the acoustic matching member 12. In the second embodiment, it is not necessary to make the connecting surface 12b larger than the first surface 11a in the case where the size of the first surface 11a is predetermined. Accordingly, the ultrasonic sensor 40 can be made compact.

The second embodiment described above may be modified to a form shown in FIG. 5. In this modified form, a wiring member 41 is formed on an inner wall of the casing 31, and another wiring member 42 is formed through the vibration-attenuating member 13. The conductive layer 16 formed on the side surface 12c of the acoustic matching member 12 is electrically connected to the processing circuit 18 through the wiring members 42, 41 and the wire 19. Namely, the first electrode 11a formed on the first surface 11a of the piezoelectric element 11 is electrically connected to the processing circuit 18 through the conductive adhesive 17, the conductive layer 16, the wiring members 42, 41, and the wire 19.

Figure 5:
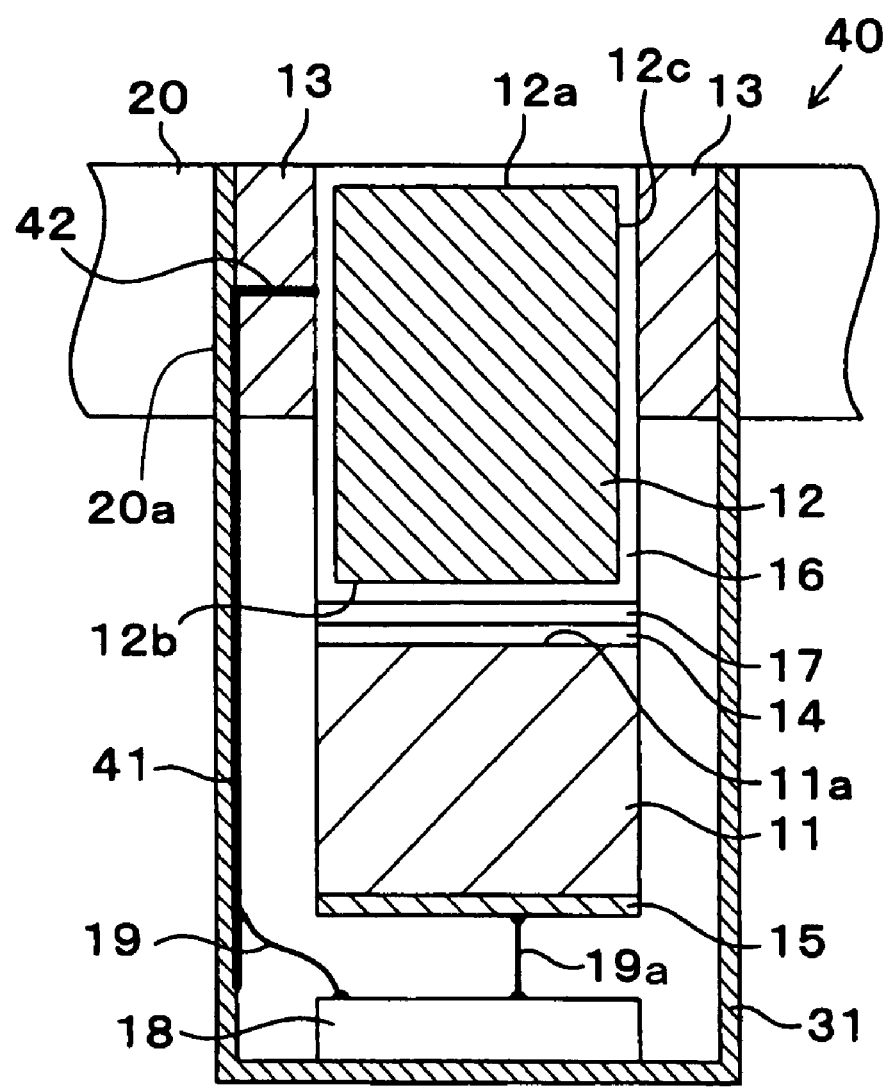
FIG. 5 is a cross-sectional view showing a modified form of the second embodiment shown in FIG. 4.

In the modified form shown in FIG. 5, the wire 19 can be made short, and thereby a chance of wire-disconnection can be reduced. In place of the wiring member 41 formed on the inner wall of the casing 31, the casing 31 itself may be made of a conductive material, or a metallic film may be formed on the inner wall of the casing 31. The vibration-attenuating member 13 may be made of a material such as conductive rubber to thereby eliminate the wiring member 42.

Figure 6A:
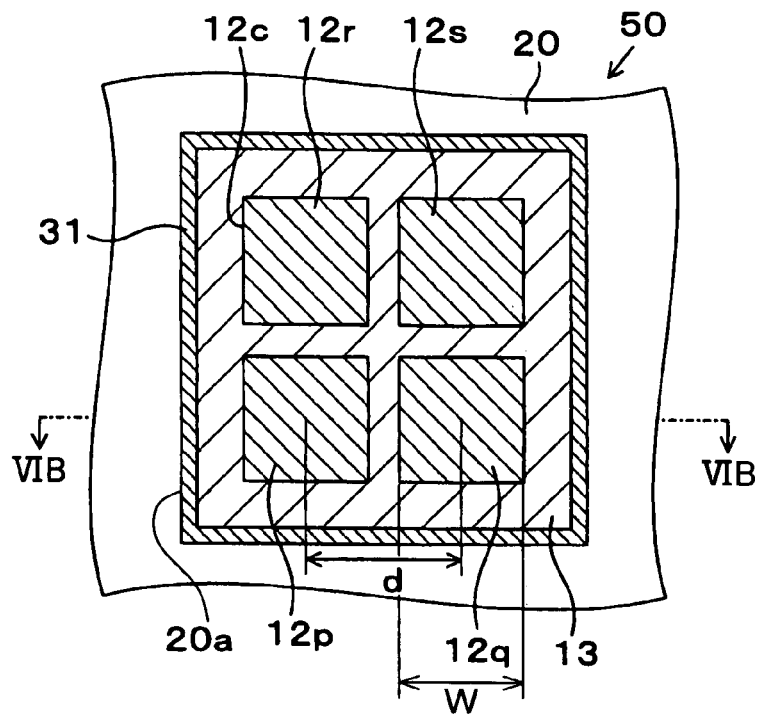
FIG. 6A is a plan view showing an ultrasonic sensor as a third embodiment of the present invention, viewed from a receiving surface of acoustic matching members connected to respective piezoelectric elements.
Figure 6B:
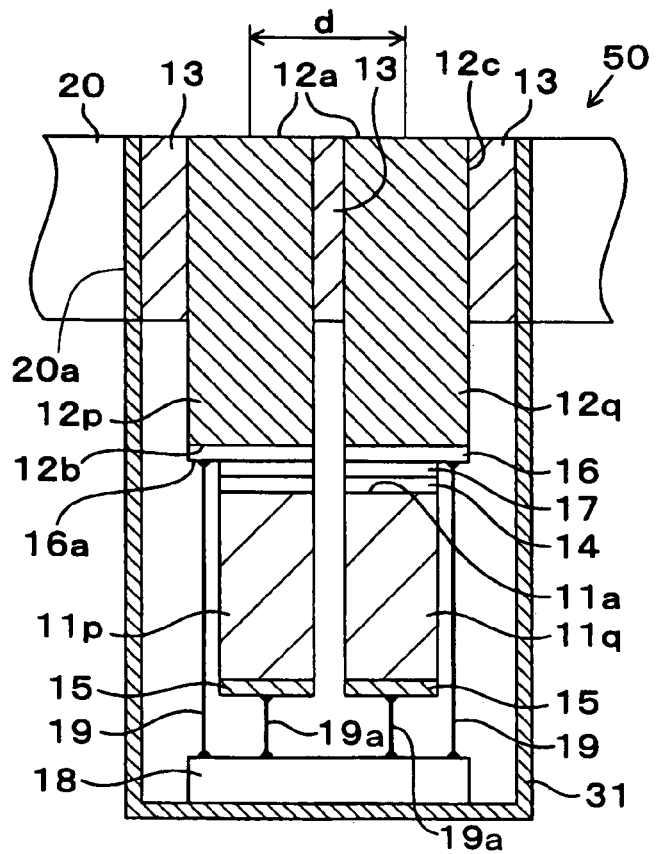
FIG. 6B is a cross-sectional view showing the ultrasonic sensor, taken along line VIB-VIB of FIG. 6A.

An ultrasonic sensor 50 as a third embodiment of the present invention will be described with reference to FIGS. 6A and 6B. In this embodiment, four pairs of combined units, each consisting of a piezoelectric element 11p-11s and an acoustic matching member 12p-12s, are arranged in an array. Three-dimensional detection of positions of an object is performed in this embodiment. Four combined units are contained in the casing 31 via the vibration-attenuating member 13, and electrically connected to the processing circuit 13 through wires 19, 19a. Not only a distance from the vehicle but also a position of the object can be detected based on phase differences among the combined units.

A width W (refer to FIG. 6A) of each acoustic matching element 12p-12s is made equal to or less than one half of a wavelength $\lambda a$ of the ultrasonic wave in air ($W \leq \frac{1}{2}\lambda a$), and a distance d (refer to FIG. 6A) between the combined units is made equal to one half of the wavelength ($d = \frac{1}{2}\lambda a$). Time differences among the combined units can be detected with high precision based on phase differences among the ultrasonic waves received by the combined units. The distance to the object and positions of the object are accurately detected.

The number of the combined units is not limited to four units, it may be set according to respective applications of the ultrasonic sensor 50. For example, only two units are required for performing two-dimensional detection. Modified forms of the first and second embodiments may be applied to the third embodiment, too. Since plural combined units are used in the third embodiment, not only the distance of the object from the vehicle but also positions of the object can be detected. Since the time differences among the ultrasonic waves received by plural combined units are detected from the phase differences thereof, detection accuracy of the ultrasonic sensor 50 can be improved.

The present invention is not limited to the embodiments described above, but it may be variously modified. As shown in FIG. 7, the ultrasonic sensor can be mounted on various positions of the automotive vehicle. When it is mounted on a headlamp cover 21, an obstacle in front of the vehicle is surely detected because the ultrasonic waves reflected on the front obstacle are not intercepted by any portions of the vehicle. When the ultrasonic sensor is mounted on a winker cover 22 or a door mirror 23, an obstacle positioned at sides of the vehicle is effectively detected. When the ultrasonic sensor is mounted on a rear lamp cover 24 or a back lamp cover 25, an obstacle positioned behind the vehicle can be detected.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An ultrasonic sensor for detecting ultrasonic waves reflected on an object to be detected, comprising:
   a piezoelectric element sandwiched between a first electrode and a second electrode;
   an acoustic matching member having a receiving surface for receiving the reflected ultrasonic waves and a connecting surface connected to the piezoelectric element via a conductive layer that is formed on and extends only along the connecting surface of the acoustic matching member; and
   a processing circuit for processing signals outputted from the piezoelectric element, the processing circuit being electrically connected to the first and the second electrodes of the piezoelectric element, wherein:
   a surface area of the conductive layer formed on the connecting surface of the acoustic matching member is larger than a surface area of the first electrode formed on the piezoelectric element, so that an overhang area not connected to the first electrode is formed on the conductive layer.

2. The ultrasonic sensor as in claim 1, wherein the casing is made of a conductive material and the conductive layer is electrically connected to the casing that is electrically connected to the processing circuit.

3. The ultrasonic sensor as in claim 1, wherein the acoustic matching member is made of polycarbonate resin.

4. The ultrasonic sensor as in claim 1, wherein the piezoelectric element is made of lead-zirconate-titanate.

5. The ultrasonic sensor as in claim 1, wherein:
   the piezoelectric element is composed of a plurality of the piezoelectric elements, and the acoustic matching member is composed of a plurality of acoustic matching members;
   each piezoelectric member is connected to each acoustic matching member, forming a combined unit; and
   a plurality of combined units are arranged in an array.

6. The ultrasonic sensor as in claim 5, wherein a distance between centers of neighboring acoustic matching members is equal to or substantially equal to one half of a wavelength of the ultrasonic wave propagating in air.

7. The ultrasonic sensor as in claim 1, wherein the ultrasonic sensor is mounted on a portion of an automotive vehicle selected from a group consisting of a headlamp cover, a rear lamp cover, a winker cover, a back lamp cover, a door mirror and a bumper.

8. The ultrasonic sensor as in claim 1, wherein the conductive layer is formed on the acoustic matching member by either vapor-deposition or printing.

9. The ultrasonic sensor as in claim 1, wherein the first and the second electrodes are formed on the piezoelectric element by either vapor-deposition or printing.

10. The ultrasonic sensor as in claim 1, wherein the conductive layer of the acoustic matching member is connected to the first electrode of the piezoelectric element with a conductive adhesive.

11. The ultrasonic sensor as in claim 1, wherein the wiring member is electrically connected to the conductive layer formed on the acoustic matching member.

12. The ultrasonic sensor as in claim 1, wherein an area of the connecting surface of the acoustic matching member is substantially equal to an area of the first electrode of the piezoelectric element.

13. The ultrasonic sensor as in claim 1, wherein the surface area of the conductive layer is generally the same as that of the connecting surface of the acoustic matching member in an imaginary plane in which the connecting surface of the acoustic matching member extends.

14. The ultrasonic sensor as in claim 1, wherein the conductive layer is formed on and extends only along the connecting surface of the acoustic matching member and therefore has a surface area that is substantially identical to a surface area of the connecting surface of the acoustic matching member.

15. An ultrasonic sensor for detecting ultrasonic waves reflected on an object to be detected, comprising:
   a piezoelectric element sandwiched between a first electrode and a second electrode;
   an acoustic matching member having a receiving surface for receiving the reflected ultrasonic waves and a connecting surface connected to the piezoelectric element via a conductive layer formed on the connecting surface;
   a processing circuit for processing signals outputted from the piezoelectric element, the processing circuit being electrically connected to the first and the second electrodes of the piezoelectric element, wherein
   a surface area of the conductive layer formed on the connecting surface of the acoustic matching member is made larger than a surface area of the first electrode formed on the piezoelectric element, so that an overhang area not connected to the first electrode is formed on the conductive layer,
   the conductive layer formed on the connecting surface of the acoustic matching member is extended at least to a side surface of the acoustic matching member,
   the ultrasonic sensor is contained in a casing, and a wiring member is formed on an inner wall of the casing for electrically connecting the conductive layer to the processing circuit, and
   a vibration-attenuating member is disposed between the acoustic matching member and the casing, the vibration-attenuating member being made of a conductive material and being electrically connected to the conductive layer that is electrically connected to the processing circuit.

* * * * *